United States Patent [19]

Yasunaga

[11] Patent Number: 5,367,946
[45] Date of Patent: Nov. 29, 1994

[54] METHOD OF MAKING COFFEE AND TEA

[76] Inventor: Kazuo Yasunaga, 13-24, Morikawachinishi 1-chome, Higashi Osakashi, Osakafu, 577, Japan

[21] Appl. No.: 974,023

[22] Filed: Nov. 10, 1992

[30] Foreign Application Priority Data

Feb. 25, 1992 [JP] Japan .................................. 4-037607

[51] Int. Cl.5 .............................................. A47J 31/42
[52] U.S. Cl. ........................................ 99/286; 99/316; 220/555; 220/704; 220/771
[58] Field of Search ................. 99/286, 279, 287, 316, 99/317, 321, 322, 323, 306; 220/704, 771, 501, 553, 554, 555; 241/199

[56] References Cited

U.S. PATENT DOCUMENTS

| D. 23,682 | 10/1894 | Ingalis | 220/704 |
| 213,455 | 3/1879 | Schenck | 220/704 |
| 870,087 | 11/1907 | Dickens | 241/199 |
| 1,367,568 | 2/1921 | Smith | 99/323 |

Primary Examiner—Robert W. Jenkins
Attorney, Agent, or Firm—Nikaido, Marmelstein Murray & Oram

[57] ABSTRACT

A method of making coffee or tea by use of a coffee maker or tea maker kit which includes a mortar, a pestle, a scoop, and a cup, the cup including a brewing section and a sipping section separated by a partition projecting inward from the inside wall of the cup, the partition having an aperture through which the finished beverage is passed and sipped.

3 Claims, 4 Drawing Sheets

5,367,946

METHOD OF MAKING COFFEE AND TEA

BACKGROUND OF THE INVENTION

1. Field of the Invention

The present invention relates to a method of brewing coffee and infusing tea, and a kit used for carrying out the method of making coffee or tea. More particularly, the present invention relates to a method of brewing coffee and infusing tea without losing the flavor and taste of coffee and tea, and a kit used for carrying out the method.

2. Background of the Invention

To make coffee, there are at least two methods; one is a submerging method, and the other is a percolating method. In the submerging method ground roasted coffee beans are submerged in boiling water for a few minutes. A drinker sips the coffee beverage after the residue of the coffee beans are filtered. In the percolating method ground roasted coffee beans are placed in a cloth or paper filter bag and boiling water is passed through the beans in the filter bag. The submerging method is common in the instant coffee field, and th percolating method is common in restaurants, tea houses, and homes.

Coffee drinkers have different liking for coffee flavors and taste. Some drinkers like strong taste but others like light flavor. In order to satisfy such customers' different liking, roasters roast coffee beans in various manners and grind them to fineness. The roasted ground coffee are sold in paper packages or in rigid containers such as metal cans or in glass Jars that are either vacuumed-packd or pressure-packed. In this way the packaged ground coffee beans are extensively distributed by retailers from central roasting bases.

Utmost care is paid but nevertheless the flavor and freshness of coffee is lost. Coffee lovers become frustrated with packaged stale coffee, and strongly wish to enjoy the fresh flavor of coffee.

Under such circumstances coffee lovers having a diversity of taste can not fully enjoy the fresh flavor of roasted coffee. This can be compared to a manner in which caught fish is eaten. That is, one method is to eat it on the spot at the seaside, other is to preserve it in a frozen state, and the other is to preserve it in cans. The freezing and canning are effective for preserving raw fish over a long period of time but disadvantageously the freshness and flavor are lost.

SUMMARY OF THE INVENTION

The present invention is directed to overcome the disadvantages and difficulties discussed above with respect to the known method of making coffee and tea.

According to the present invention, there is a coffee and tea maker kit which includes a mortar, a pestle, a scoop, and a cup which functions as a brewer. More specifically, the cup includes a brewing section and a sipping section separated by a perforated partition projecting inward from the inside wall of the cup, the partition having an aperture through which the finished beverage is passed.

According to another aspect of the present invention, there is a method of making coffee and tea which includes the steps of preparing a cup including a brewing section and a sipping section separated by a partition projecting inward from the inside wall of the cup, the partition having an aperture through which the finished beverage is passed, placing ground coffee beans in the brewing section of the cup, effecting a first steaming by pouring boiling water into the brewing section and covering the cup with a lid for a period of time, and effecting a second steaming by pouring boiling water into the brewing section to the extent not to exceed the partition and covering the cup with the lid for a longer period of time than that for the first steaming.

Thus, the invention described herein makes possible the objectives of making coffee and tea without losing the flavor, taste and aroma of freshly finished beverage, and without using a special coffee maker such as a drip maker, a percolator and a tea infusion maker, and enabling coffee or tea lovers to make coffee or tea at hand.

BRIEF DESCRIPTION OF THE DRAWINGS

This invention may be better understood and its numerous objects and advantages will become apparent to those skilled in the art by reference to the accompanying drawings as follows.

DETAILED DESCRIPTION OF THE INVENTION

Figure 1:
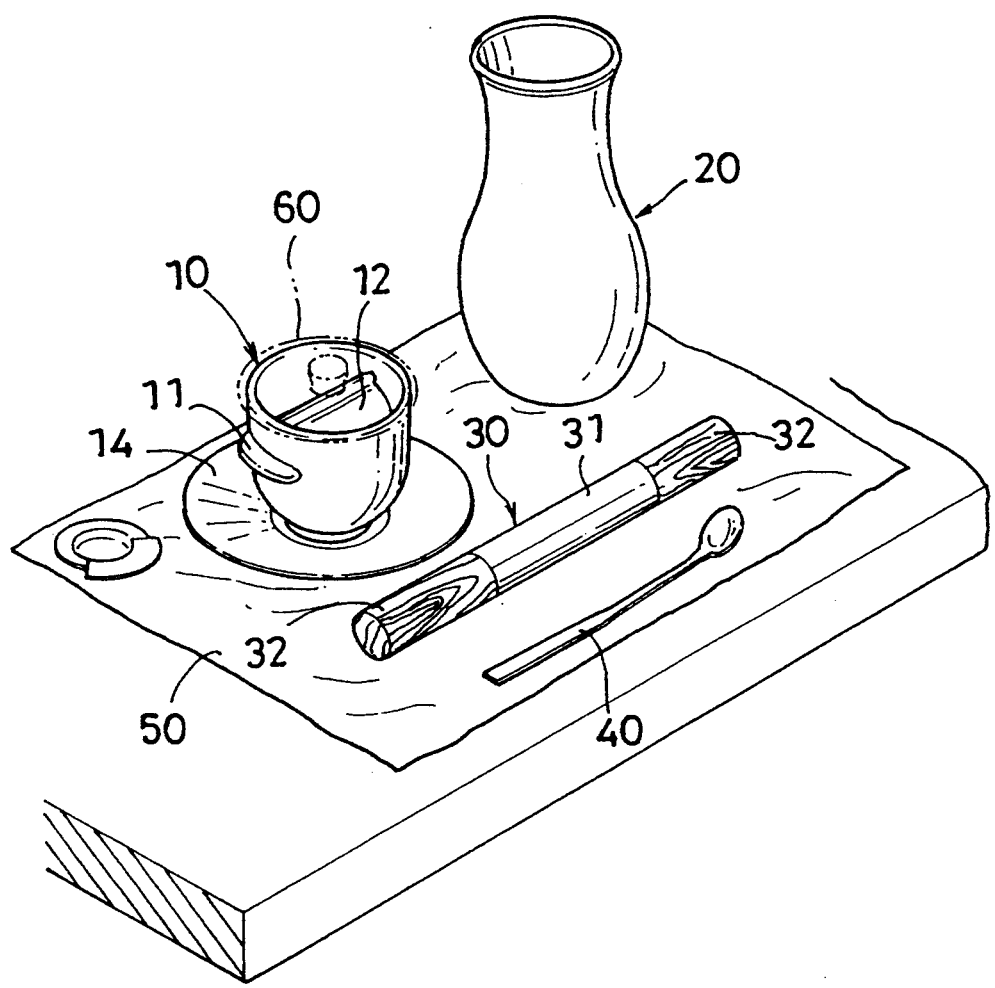
FIG. 1 is a perspective view showing a coffee and tea maker kit according to the present invention.

Referring to FIG. 1, the exemplary coffee and tea maker kit includes a cup 10, a mortar 20, and a pestle 30. The reference numeral 40 designates a scoop. Preferably the mortar 20 and the pestle 30 are made of wood, bamboo or marble. Metal tends to spoil the flavor of the ground coffee beans placed the mortar 20. The present invention can be applied not only to coffee but also to tea. Hereinafter, the present invention will be described by way of example in which coffee is brewed.

Figure 3A:
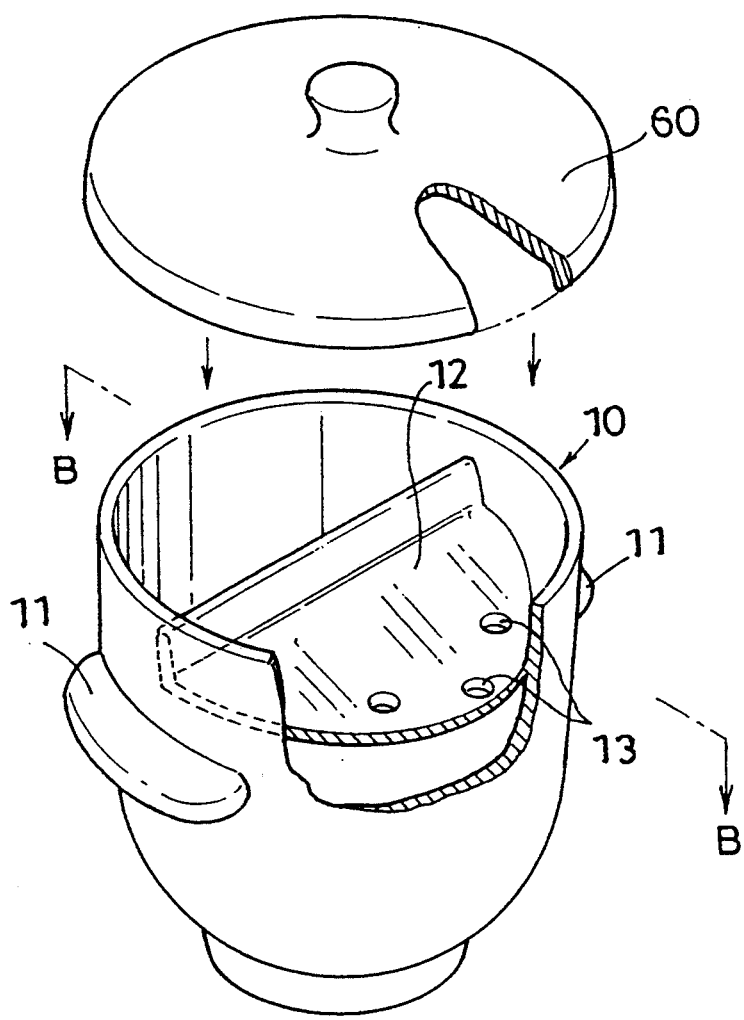
FIG. 3A is a perspective view, partly broken, showing a cup and a lid.
Figure 3B:
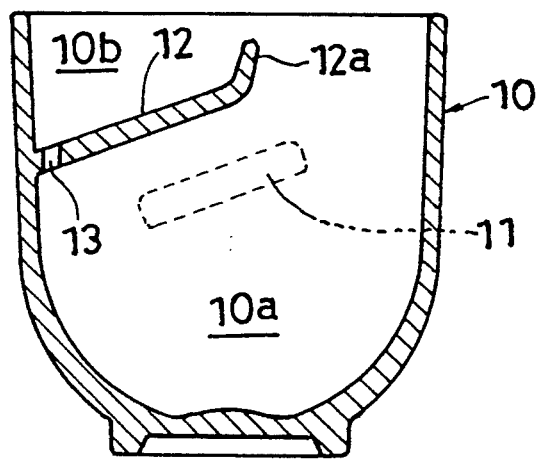
FIG. 3B is a vertical cross-section taken along the line B—B in FIG. 3A.

The cup 10 is made of ceramics, glass or plastics and is provided with handles 11 on diametrically opposite sides with respect to the drinker. The cup 10 includes a brewing section 10a and a sipping section 10b separated by a perforated partition 12 which functions as a filter. As shown in FIG. 3B, the partition 12 is provided with three apertures 13 produced near to the drinker; that is, near the inside wall of the cup 10, and is generally raised toward the terminating edge 12a which is preferably bent upward. Each aperture 13 has a size which can filter out coffee bean residues in the cup 10 against entering the sipping section 10b. The cup 10 can be provided with a spout whereby the content can be poured into several smaller cups and shared by several drinkers.

Figure 4:
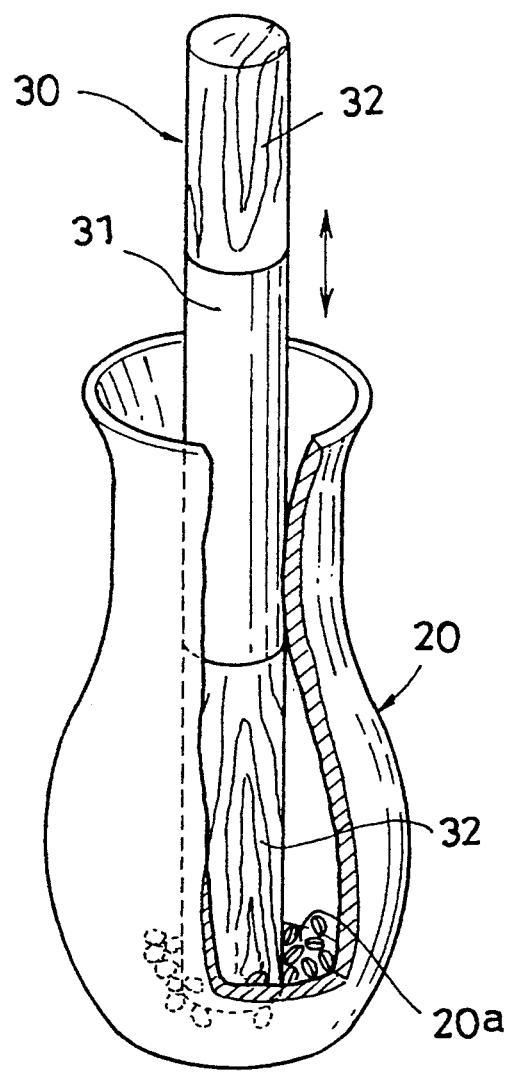
FIG. 4 is a perspective view showing the mortar and pestle shown in FIG. 4.

The mortar 20 is preferably made of marble, and as shown in FIG. 4, is generally shaped in the form of a bottle with a narrowed waist portion. The waist portion has such a diameter as to allow the pestle 31 to slightly touch the inside surface of the mortar 20 with no substantial gap therebetween so as not to allow the fragrance of the ground coffee beans to escape outside. Ceramics is also effective to keep the fragrance of coffee inside.

The pestle 30 is cylindrical, including wooden portions 32 and a stainless steel portion 31 (SUS 304) interlocated therebetween; the wood is preferably hard wood such as oak and cherry tree, or alternatively, it can be plastic or ceramics. The diameter is about 3 cm, but depends upon the size of the mortar 20.

The scoop 40, preferably made of bamboo or wood, is used to scoop the ground coffee beans 20a in the mortar 20 and place them in the cup 10. The scoop 40 is long enough to reach the bottom of the mortar 20.

In use, 10 to 40 g of roasted coffee beans is placed in the mortar 20. The pestle 30 is manually moved up and down as shown by the arrows in FIG. 4. The coffee beans 20a are cracked between a tip end of the pestle 30 and the bottom of the mortar 20, and cut to a desired degree of fineness. While grinding, the drinker can enjoy the aroma emitting from the ground coffee beans.

Figure 2:
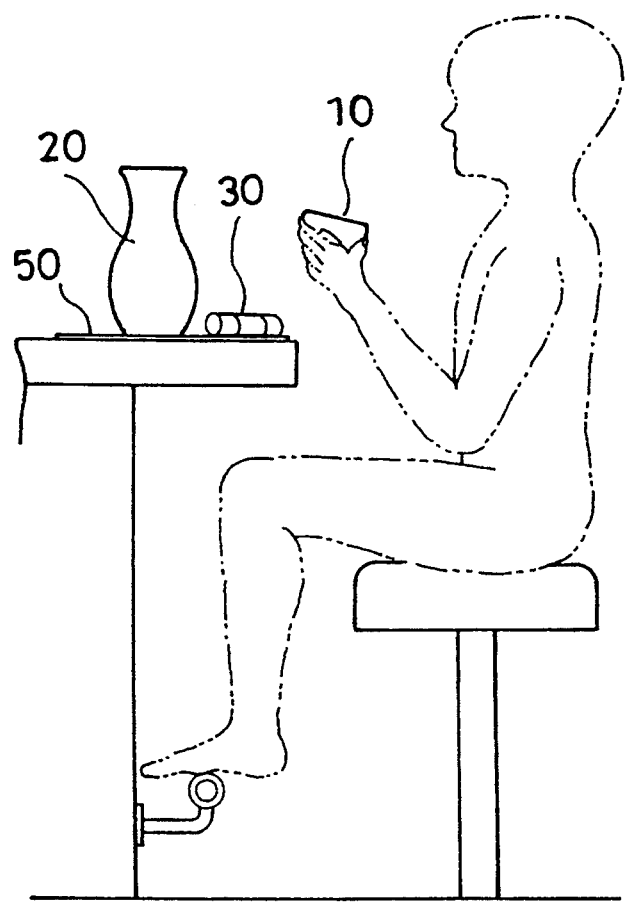
FIG. 2 is a diagrammatic view showing the coffee and tea maker kit of FIG. 1 in use.

The cup 10 is previously rinsed with hot water. Ten to twenty grams of the ground coffee beans is shifted from the mortar 20 into the cup 10 by the scoop 40, and about 50 cc of boiling water (90° to 100° C.) is poured into the cup 10. Then, the cup 10 is closed with a lid 60 for about 20 seconds. The coffee beans are steamed in the closed cup 10. Boiling water (90° to 100° C.) is again poured to two-thirds of the capacity of the cup 10. The cup 10 is again closed with the lid 60 for one to three minutes. The illustrated lid 60 is specially made for this purpose, but instead of making it, a saucer 14 can be used as a lid. The lid 60 is made of the same material as that for the cup 10. The drinker sips the coffee in the sipping section 10b through the apertures 13. Before sipping, floating coffee bean residues and bubbles are removed by a teaspoon or the like. The drinker sits on a stool in front of the cut as shown in FIG. 2, and sips the coffee by tilting the cup 10 toward himself or herself. About 10 cc of the coffee rises up on the partition 12 through the apertures 13. As shown in FIG. 3B, the handles 11 are inclined in parallel with the partition 12, so as to enable the drinker to sip the coffee through the apertures 13.

The drinker can enjoy the flavor, taste and aroma of the coffee which is freshly brewed in the brewing section 10a. These qualities depend upon the grain size of the ground beans, and therefore the drinker can decide the degree of fineness in accordance with his or her liking.

The kit embodying the present invention is not limited to coffee but can be applied to tea where instead of ground coffee beans, tea leaves are placed in the brewing section 10a and infused therein.

As is evident from the foregoing description, according to the present invention it is not necessary to use a special coffee brewer such as a drip coffee maker, a brewing basket, a percolator, and a tea infusion maker.

Although the present invention has been fully described by way of examples with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A kit comprising a mortar, a pestle, a scoop, and a cup, the cup comprising a brewing section and a sipping section separated by a partition projecting inward from the inside wall of the cup, the partition having an aperture through which the finished beverage is passed and sipped, the cup having handles on diametrically opposite sides of the outside wall thereof with respect to the drinker side of the cup, the handles being formed in a tilted position so as to be in parallel with the partition.

2. A kit comprising a mortar, a pestle, a scoop, and a cup, the cup comprising a brewing section and a sipping section separated by a partition projecting inward from the inside wall of the cup, the partition having an aperture through which the finished beverage is passed and sipped, the pestle being cylindrical, and comprising a wooden portion at each end portion and a metal portion therebetween.

3. A kit comprising a mortar, a pestle, a scoop, and a cup, the cup comprising a brewing section and a sipping section separated by a partition projecting inward from the inside wall of the cup, the partition having an aperture through which the finished beverage is passed and sipped, the mortar comprising a narrowed waist portion having an inside diameter which allows the pestle to slide along the inside wall of the waist portion with no substantial gap therebetween.

* * * * *